United States Patent [19]
Johnston, Jr. et al.

[11] 3,754,195
[45] Aug. 21, 1973

[54] DOUBLE-FOLDED ASTIGMATICALLY COMPENSATED OPTICAL CAVITIES

[75] Inventors: Wilbur Dexter Johnston, Jr., Holmdel; Peter Klaus Runge, Fair Haven, both of N.J.

[73] Assignee: Bell Telephone Laboratories, Incorporated, Murray Hill, N.J.

[22] Filed: Mar. 16, 1972

[21] Appl. No.: 235,198

[52] U.S. Cl. .......................... 331/94.5, 356/106 LR
[51] Int. Cl. ............................................. H01s 3/08
[58] Field of Search .................................. 331/94.5; 356/106 LR

[56] References Cited
UNITED STATES PATENTS
3,479,620  11/1969  Rigrod ............................. 331/94.5

OTHER PUBLICATIONS
Rigrod, Bell System Tech. Journal, Vol. XLIV, No. 5, May–June 1965, pp. 907-916, TK 1 E4.

Kogelnik, Bell System Tech. Journal, Vol. XLIV, No. 5, May–June 1965, pp. 455-494, TK 1 E4.

*Primary Examiner*—Ronald L. Wibert
*Assistant Examiner*—R. J. Webster
*Attorney*—W. L. Keefauver

[57] ABSTRACT

There is disclosed an improvement of a folded astigmatically compensated optical resonator of the type heretofore used for dye lasers to provide more efficient operation by providing a beam waist at a unique axial position in the highly focusing section of the resonator. To obtain the unique beam waist, another section is added to the folded resonator so that the highly focusing section is the middle section. In addition, resonator loss due to coma can be reduced by orienting the two end sections so that they intersect each other.

5 Claims, 7 Drawing Figures

FIELD DISTORTION, FIG. 1

FIELD DISTORTION, FIG. 5

(1)

DOUBLE-FOLDED ASTIGMATICALLY COMPENSATED OPTICAL CAVITIES

BACKGROUND OF THE INVENTION

This invention relates to optical resonators, particularly those which are compensated for optical distortions that occur in some resonators.

In the copending patent application of A. Dienes, E. P. Ippen, H. W. Kogelnik and C. V. Shank, Ser. No. 154,087, filed June 17, 1971 and assigned to the assignee hereof, a compound three-mirror optical resonator is provided with compensation for astigmatic distortion. Such resonators have proved useful for dye lasers and other applications.

A folded resonator is desirable for an optically pumped dye laser or other optically pumped device partly because the light can be highly focused in one section of the resonator and yet substantially collimated in another section and partly because compactness results from the use of reflectors as focusing elements. Nevertheless, the folding produces astigmatism. The above-cited copending patent application proposes to select the angle of folding so that the foregoing astigmatism is at least partially compensated by the astigmatism introduced by the dye cell or other optically pumped device typically disposed with its entrance and exit surfaces at Brewster's angle for the range of wavelengths being employed. Such Brewster-angle disposition introduces an astigmatism of its own. The invention of the above-cited copending patent application was based on the recognition that the angle of folding and resulting astigmatism of the folded resonator can be used to compensate the astigmatism of the cell in such a way as to provide improved overall stability of the resonator.

Nevertheless, it is still true that in such a resonator conditions of optimum efficiency have not been achieved since that resonator does not provide a unique beam waist location in the highly focusing section. In fact, there are two distinct minima of beam cross-sectional areas in the highly focusing section of such a folded resonator. It follows that the beam cross-sectional area is larger than minimum between these two minima and lacks the intensity desired within the Brewster-angle cell, for most efficient operation.

SUMMARY OF THE INVENTION

We have recognized that the foregoing problem can be solved by providing a double-folded optical resonator proportioned to yield a unique beam waist location in the highly focusing section of the resonator. Our double-folded resonator disposes the highly focusing section as the link between two other sections of our double-folded resonator.

According to an additional feature of our invention, resonator loss due to another type of optical distortion known as coma can be reduced by orienting the two end sections so that they intersect each other.

BRIEF DESCRIPTION OF THE DRAWING

Further features and advantages of our invention will become apparent from the following detailed description, taken together with the drawing, in which.

DESCRIPTION OF ILLUSTRATIVE EMBODIMENTS

Figure 1:
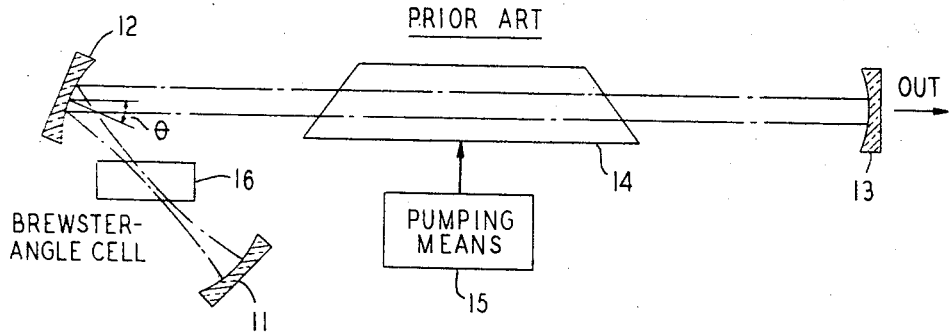
FIG. 1 is a partially pictorial and partially block diagrammatic illustration of the prior art resonator which we have improved.

While the previously disclosed resonator of FIG. 1 is described in full detail in the above-cited copending patent application, it will be briefly described here to make clear the problem that we have solved.

The highly focusing section of the folded optical resonator of FIG. 1 comprises the reflectors 11 and 12 with relatively short radii of curvature. The remaining section of the resonator includes the reflector 12 and an additional reflector 13 which has a relatively large radius of curvature. In the most typical application of such a resonator, a dye laser is constructed by disposing a Brewster-angle dye cell 16 in the highly focusing section. That is, the entrance and exit surfaces of cell 16 are disposed approximately at Brewster's angle with respect to the axis of the light beam in that resonator section for the wavelength of dye laser resonation employed. The angle $\theta$ between this section of the resonator and the longer section in which the light is substantially collimated is adjusted so that the astigmatism due to the off-axis mirror 12 and the astigmatism due to the Brewster-angle cell 16 are substantially compensatory in the sense that the stability of the resonator is maximized for the given values of radii of curvature of reflectors 11, 12 and 13.

Nevertheless, the beam waists in the highly focusing section and specifically in cell 16 are elliptical. At differing positions along the beam path through cell 16 there occur two minima of beam cross-sectional areas as shown by curve 21 of FIG. 2. The two beam waists occur at these minima; and their elliptical cross-sectional shapes are elongated in mutually orthogonal directions.

Figure 2:
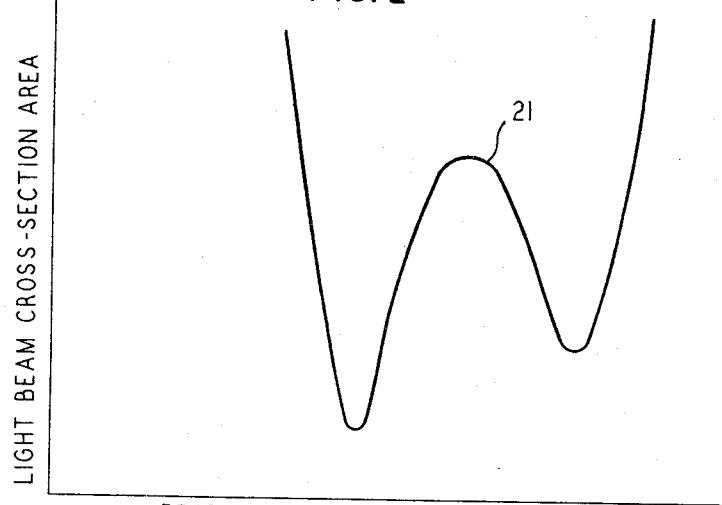
FIG. 2 shows a curve illustrating the variation of cross-sectional area of the light beam in the highly focusing resonator section of FIG. 1.

It will be noted in FIG. 2 that only so much of curve 21 is shown as is relevant to the behavior of the beam within the cell 16. The increase in beam cross-sectional area, particularly in the cross-sectional area of the pumping light beam in cell 16 between the two minima, reduces the efficiency of operation of the dye laser and increases its threshold for oscillation.

Moreover, the configuration of FIG. 1 provides some difficulty in pumping the dye laser. In some configurations the pump laser 14, pumped by its pumping means 15, is efficiently coupled to the dye laser by disposing the gain medium of laser 14, as shown, along the axis of the section comprised of reflectors 12 and 13. In the alternative, if a dispersive element such as a dispersive prism (not shown) is disposed in the section 12–13 so that the pumping laser beam can be introduced by propagating it just past an edge of reflector 13, then the pump laser must provide a single-frequency pumping radiation since the use of such a dispersive prism is not satisfactory for a multiple-frequency pump. As another alternative (not shown), the pumping radiation can be injected through a curved reflector such as the highly curved reflector 11. Such an arrangement is possible but generally inconvenient, mainly because of losses attributable to the inability to mode-match the pumping beam to the cavity through such a reflector.

Figure 3:
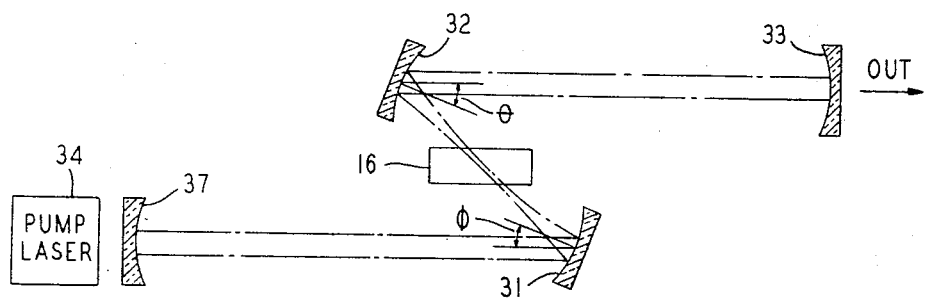
FIG. 3 is a partially pictorial and partially block diagrammatic illustration of a first embodiment of our invention.

In contrast, in the double-folded resonator according to our invention, as shown in FIG. 3, not only is the dye cell 16 more efficiently pumped by a pump beam having a single waist suitably centered in the cell, but the pumping laser light can be readily introduced and mode-matched to the cavity through a less highly curved end reflector 37 without interferring with the output coupling of the laser light through the opposite end reflector 33. The double-folded resonator of FIG. 3 is completed by the highly curved off-axis reflectors 31 and 32, which replace reflectors 11 and 12 of the prior art apparatus. Reflector 31 is adapted with respect to end reflector 37 to provide an essentially collimated beam, or at least a less highly focused beam therebetween.

For convenience of illustration in FIG. 3, we have assumed that the two end sections are optically symmetrical with respect to the highly focusing center section of the resonator. The two angles of folding are equal. The two equal length end sections support like mode shapes. By the symmetry of the resonator of FIG. 3, the highly focused elliptical beam in cell 16 has a unique single minimum cross-sectional area at one axial position therein. Cell 16 is centered upon this position. Compensation for astigmatic distortion is still achieved in the embodiment of FIG. 3, as in the prior art arrangement of FIG. 1, because the resonator of FIG. 3 can be viewed as two coupled resonators centered about a reflective plane orthogonally cutting the resonator at the center of the Brewster-angle cell 16. Each half of the resonator, then, can be adjusted for compensation and resulting stability, as in the arrangement of FIG. 1. Thus, the amount of astigmatism due to half of the thickness of the Brewster-angle cell 16 is compensated by the folding of one end section and the curvature of its end reflector 37; and the amount of astigmatism due to the other half of cell 16 is compensated by the angle of folding of the other end section of the resonator and the curvature of its end reflector 33. These compensations are done according to the formulae in the above-cited copending patent application.

The most important advantage of the double-folded arrangement of FIG. 3 is that much higher power concentration is achievable in the central region of the Brewster-angle cell 16, since there is a single minimum of pumping area with respect to axial position within the cell for any degree of focusing. A lower threshold of dye laser operation is a result of such a higher power concentration in cell 16.

The pumping laser light from source 34 is advantageously injected into the dye laser cavity through a reflector 37 which has a much larger radius of curvature, and therefore is much flatter, than reflectors 31 and 32. The pumping laser light may be easily mode matched to a resonant mode of the optical resonator.

Figure 4:
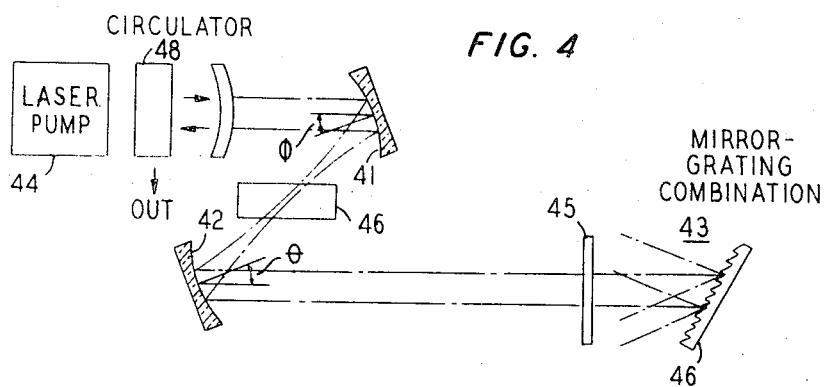
FIG. 4 shows a modification of the embodiment of FIG. 3 to facilitate tuning.

A modification of the embodiment of FIG. 3 is shown in FIG. 4. In FIG. 4 a grating 46, or alternatively, a tuning prism (not shown), is introduced into one of the end sections of the double-folded resonator. Also of note in the modified embodiment of FIG. 4 is that the length of the other end section of the resonator can be shortened by employing a convex refelector 47 and moving its position toward the highly focusing reflector 41, so that the end sections are no longer of equal length. At this new position the surface of reflector 47 matches the wave front of the desired dye laser mode. Further, in order to couple the dye laser radiation out through mirror 47 as well as coupling the pump radiation therethrough, an optical circulator 48 of known type is disposed between pump source 44 and reflector 47. In other respects, the components of FIG. 4 are numbered 10 digits higher than the corresponding components of FIG. 3, except that cell 46 is now the dye laser cell.

It may be seen that reflector 33 of FIG. 3 is replaced in the modified embodiment of FIG. 4 by the mirror grating combination 43 in which grating 46 is merely one of the components. The mirror grating combination 43 also includes the partially transmissive reflector 45 which forms an auxiliary resonator with grating 46 and which helps to make the optical resonator as a whole relatively insensitive to the specific optical losses within the mirror grating combination 43. Illustratively, the reflectivity of reflector 45 is 80 to 90 percent.

The wavelength discrimination of the grating 46, as it is rotated about an axis orthogonal to the paper, increases with the axial length $l$ of the auxiliary resonator, so that this section of the resonator is typically made relatively long. The other end section of the double-folded resonator nevertheless need not be made equally long to that including reflectors 42, 45 and 46 so long as it is optically equivalent. The change in the curvature of reflector 47 to match it to the mode of the corresponding symmetrical cavity of the type shown in FIG. 3 achieves this result. In terms of the conventional terminologies of the laser art, the two end sections of the double-folded resonator should have equal confocal parameters. In addition, the symmetry includes equal angles of folding of the end sections.

The grating 46 is advantageous in a resonator according to the present invention because it enables the tuning of a dye laser oscillation within the resonator throughout the broad tuning band of a typical active dye solution usable in cell 46. For example, the dye could be rhodamine 6G.

At the same time that such broad band tuning is achieved by grating 46 in the right-hand end section, it is advantageous to pump the dye through the opposite end section of the resonator since that section has no dispersive element therein and permits a multiple-oscillation high-power pumping radiation to be used efficiently.

A tunable resonator such as that shown in FIG. 4 and also another equivalent resonator using an internal prism in one end section for tuning have actually been operated and have been found to exhibit the predicted advantages in comparison to the arrangement of FIG. 1. In these experiments, the pumping laser source 14, 44 was a pulsed xenon laser oscillating at a wavelength of 535.2 nanometers and the dye solution in cell 16 and in cell 46 was rhodamine 6G in ethanol. The pumping laser emitted also several other lines or distinct oscillations, typically five to seven lines between 470 and 510 nanometers, which are useful for pumping the dye in these configurations.

In particular, lower threshold and greater stability for the same degree of focusing in the center section as in the highly focusing section of the above-cited copending application have been observed.

Moreover, the achievement of successful continuous-wave oscillation in other dyes will be promoted by the use of resonators according to our invention since tighter focusing of the dye laser beam within the dye cell is provided and the minimum spot size limitations previously believed to be inherent in the configurations of the above-cited copending application are eliminated.

Figure 5:
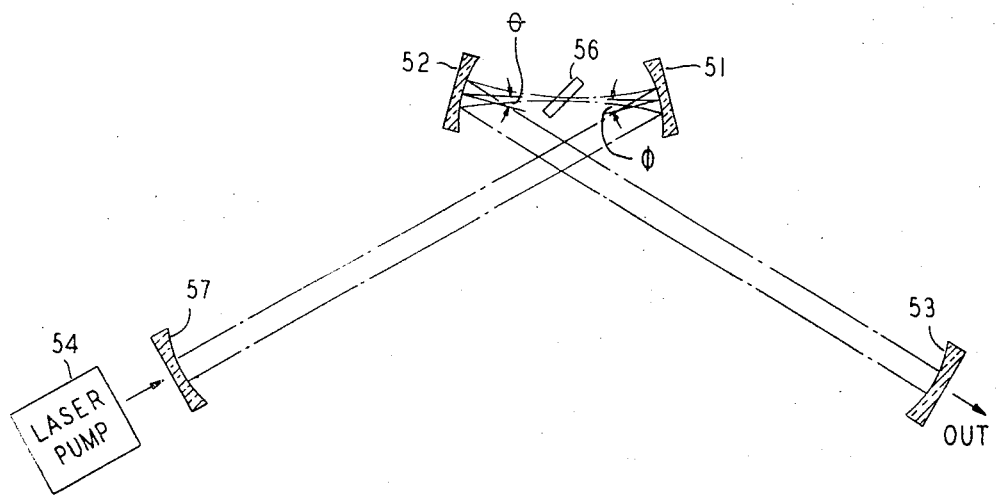
FIG. 5 shows a further modification of the embodiment of FIG. 3 to reduce coma loss.

Optical resonator configurations according to our invention can be still further improved, as shown in the modified embodiment of FIG. 5. Specifically, the embodiment of FIG. 5 will provide less resonator loss due to a distortion of the type known as coma.

The embodiment of FIG. 5 includes components exactly analogous to those of FIG. 3 and numbered twenty digits higher, except that the Brewster-angle cell 56 is numbered forty digits higher than the corresponding component in FIG. 3. The difference in the embodiment of FIG. 5 from the embodiment of FIG. 3 is that the output resonator section is swung through an angle $2\theta$ across the center section so that the two end sections intersect in an X-like configuration.

Figure 6A:
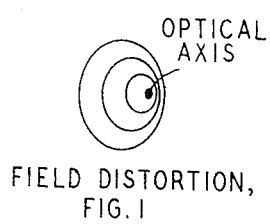
FIGS. 6A and 6B compare the transverse field distortions known as coma for the embodiments of FIGS. 1 and 5.

Astigmatism is not the only aberration present in a resonator of the type shown in FIGS. 1, 3 and 4. Specifically, there is another type of aberration known as coma, which occurs for each fold in the resonator and is proportional to $\theta^2$, where $\theta$ is the angle of folding. This aberration represents a loss to the laser because the transverse field distribution of the light deviates from the desired Gaussian distribution. The subject transverse distortion of the field distribution which is the product of this aberration is shown in FIG. 6A via a pattern of constant intensity lines in a corss section of the optical beam in cell 56. It will be noted that the highest intensity is off-center.

If one now carries out an analysis of the angles of folding required to achieve compensation of astigmatism for stability of the resonator of FIGS. 3, 4 or 5, one finds that the angles of folding needed are 1/ 2 as large as in the embodiment of FIG. 1 for optical cells 16, 46 and 56 of equal thickness and equal radii of curvature of mirrors 12, 32, 42 and 52.

Figure 6B:
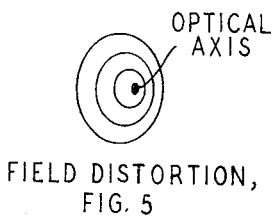

In other words, the transverse field distortions resulting from this type of aberration in the embodiment of FIGS. 3, 4 or 5 will now look more like that illustrated in FIG. 6B in which, again, the lines are lines of constant field intensity in a beam cross section in cell 56. The intensity maximum is now more centrally located. The loss of the optical resonators of FIGS. 3 or 4 due to coma is proportional to twice the square of the quantity $\theta$ or $\phi$, for the two folds respectively, e.g., $2 \times \theta^2$, for $\theta = \phi$, which is exactly the same as the loss of the resonator of FIG. 1. In the optical resonator of FIG. 5, however, the comatic field distortion due to mirror 52 is compensated by the coma of mirror 51. Mirror 51 images the field of FIG. 6B occurring inside the optical cell 56 into a Gaussian field distribution on mirror 57. The resonator of FIG. 5, therefore, does not have optical losses due to coma.

It should be understood that the embodiment of FIG. 5 can be further modified to make the resonator more compact and to facilitate tuning by the techniques illustrated in the modified embodiment of FIG. 4.

We claim:

1. An optical resonator comprising means for introducing an optical beam therein, first, second and third sections forming path segments to be traversed by said beam, including reflective elements at the relatively remote ends of the path segments of said first and second sections and including circularly symmetrical focusing means for optically connecting said first and second sections to opposite ends of said third section, for folding the optical paths in said first and second sections with respect to the optical path in said third section, and for convergently focusing the beam to a waist in said third section, and a Brewster-angle cell disposed in said third section and encompassing said waist, said first and second sections having mutual angles of folding and degrees of focusing to yield the only beam waist for all cross-sectional directions in said third section at a unique location on the path segment in said cell.

2. An optical resonator according to claim 1 in which the first and second sections include end reflectors opposite the third section curved to provide equal confocal parameters for said first and second sections.

3. An optical resonator according to claim 1 in which said first and second sections are optically symmetrical with respect to said third section.

4. An optical resonator according to claim 1 in which one of the first and second sections includes means for tuning the resonant frequencies of said resonator and the other of said first and second sections has a partially transmissive end reflector.

5. An optical resonator according to claim 1 in which distinct portions of said resonator have characteristic coma and in which the first and section sections intersect at intermediate points separated from any focusing elements or reflecting elements on the path segments in said first and second sections to counteract said coma.

* * * * *